United States Patent
Dorsey et al.

(10) Patent No.: US 7,917,985 B2
(45) Date of Patent: Apr. 5, 2011

(54) WIPES WITH HAIR AND LARGE PARTICLE PICK-UP CAPABILITIES

(75) Inventors: Kyra Dorsey, Greensboro, NC (US); Jessica Kapik, Greensboro, NC (US)

(73) Assignee: The Procter & Gamble Company, Cincinnati, OH (US)

( * ) Notice: Subject to any disclaimer, the term of this patent is extended or adjusted under 35 U.S.C. 154(b) by 1191 days.

(21) Appl. No.: 11/416,575

(22) Filed: May 3, 2006

(65) Prior Publication Data

US 2007/0009708 A1 Jan. 11, 2007

Related U.S. Application Data

(60) Provisional application No. 60/677,243, filed on May 3, 2005.

(51) Int. Cl.
*A47L 13/12* (2006.01)

(52) U.S. Cl. .............................. 15/118; 15/209.1; 15/208

(58) Field of Classification Search ...................... 15/121, 15/237, 238, 118, 209.1, 208; 428/138, 107
See application file for complete search history.

(56) References Cited

U.S. PATENT DOCUMENTS

| | | | |
|---|---|---|---|
| 3,616,133 A | 10/1971 | Thomas | |
| 6,280,676 B1 * | 8/2001 | Cederblad | 264/291 |
| 2005/0079315 A1 | 4/2005 | Seth et al. | |
| 2005/0132519 A1 * | 6/2005 | Chen et al. | 15/121 |

OTHER PUBLICATIONS

International Search Report and The Written Opinion of the International Searching Authority, corresponding to International Application No. PCT/US2006/017051, mailed Sep. 20, 2006.

* cited by examiner

*Primary Examiner* — Shay L Karls
(74) *Attorney, Agent, or Firm* — Jeffrey V Bamber

(57) ABSTRACT

Wipes capable of picking up hair and other large particles, and methods of making same, are provided. A wipe includes a layer of netting material bonded to a substrate, and subsequently stretched via ring rolls such that strands of the netting material break and extend outwardly from the substrate to form teeth. The wipe may be impregnated with one or more chemical ingredients, such as cleaning solutions, soaps, antiseptics, surfactants, tackifying agents, antimicrobial agents, detergents, bleaches, polishes, and facial cleansers. The wipe may be electrostatically charged.

14 Claims, 6 Drawing Sheets

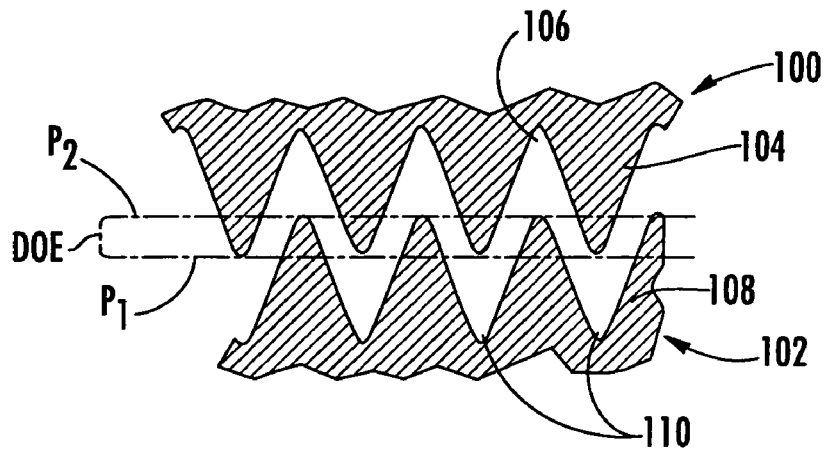
FIG. 6
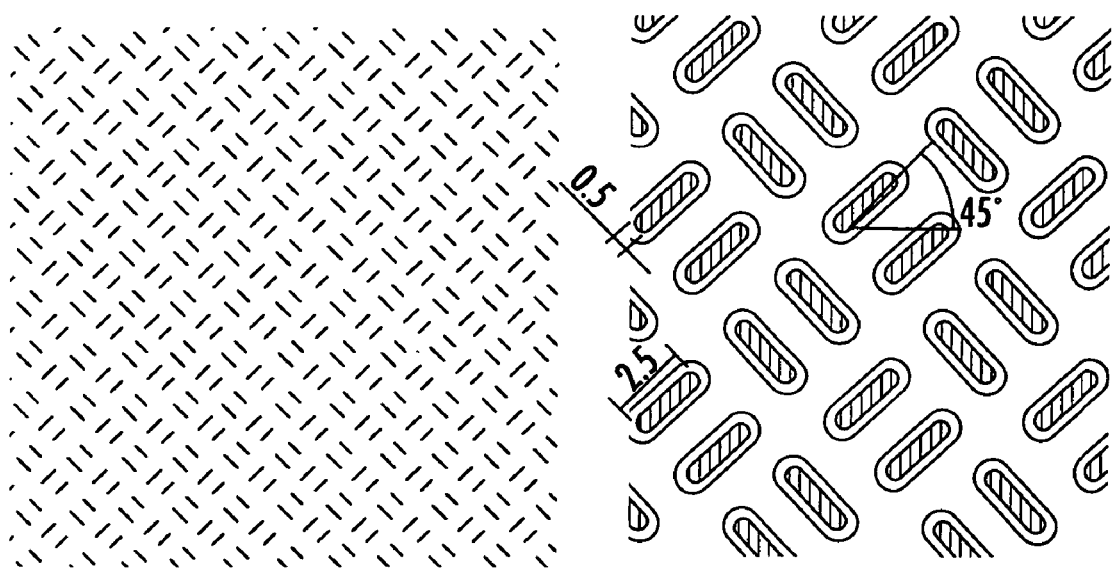
FIG. 7A  FIG. 7B

WIPES WITH HAIR AND LARGE PARTICLE PICK-UP CAPABILITIES

RELATED APPLICATION

This application claims the benefit of and priority to U.S. Provisional Patent Application No. 60/677,243, filed May 3, 2005, the disclosure of which is incorporated herein by reference as if set forth in its entirety.

FIELD OF THE INVENTION

The present invention relates generally to cleaning products and, more particularly, to cleaning products for wiping surfaces.

BACKGROUND OF THE INVENTION

Cleaning wipes have been used for a variety of purposes, including body cleaning, cleaning of hard surfaces, cleaning dishware, flatware, pots and pans, etc. Conventional cleaning wipes may contain various compounds to accomplish their intended purpose. For example, cleaning wipes may include inverse emulsions (i.e., water-in-liquid) to clean infants. Cleaning wipes may also include waxes to polish and clean furniture, soaps and detergents to clean hands, counter tops, floors, and the like. Cleaning wipes may also include ammonia to clean glass surfaces. Alcohol and various other biocides may be included to disinfect a variety of surfaces.

Conventional cleaning wipes are typically soft and may not work well in applications where some amount of scrubbing is necessary to clean a surface. In addition, conventional dry cleaning wipes may not be capable of picking up hair and other large particles (e.g., dirt particles, etc.), even after being electrostatically charged. As such, there is a need for improved cleaning wipes that can scrub surfaces and that can pick up hair and other large particles.

SUMMARY OF THE INVENTION

In view of the above discussion, methods of making wipes capable of picking up hair and other large particles are provided. According to some embodiments of the present invention, a method of making a wipe includes bonding a layer of netting material to a substrate, and subsequently stretching the bonded layer of netting material and substrate such that strands of the netting material break and extend outwardly from the substrate to form teeth. The netting material may be bonded to the substrate in any of various ways including, but not limited to, chemical bonding, thermal bonding, ultrasonic bonding, and/or physical bonding. The bonded layer of netting material and substrate may be stretched in the machine direction (MD) and/or in a cross direction (CD) that is transverse to the MD.

According to some embodiments of the present invention, stretching the bonded layer of netting material and substrate includes passing the bonded layer of netting material and substrate through a pair of ring rolls, wherein each ring roll comprises a plurality of teeth and corresponding grooves that extend about the circumference thereof, and wherein the teeth of each ring roll intermesh with the grooves of the other ring roll.

According to some embodiments of the present invention, stretching the bonded layer of netting material and substrate includes passing the bonded layer of netting material and substrate through a pair of calendar rolls, wherein a surface of one roll is smooth, wherein a surface of the other roll has a pattern engraved thereon, and wherein the layer of netting material contacts the roll having the surface with the engraved pattern.

According to some embodiments of the present invention, stretching the bonded layer of netting material and substrate includes passing the bonded layer of netting material and substrate through a pair of calendar rolls, wherein a surface of each roll is smooth.

According to some embodiments of the present invention, one or both of the netting material and substrate may be impregnated with one or more chemical ingredients. Such chemical ingredients may include, but are not limited to, cleaning solutions, soaps, antiseptics, surfactants, tackifying agents, antimicrobial agents, detergents, bleaches, polishes, and facial cleansers.

According to some embodiments of the present invention, one or both of the netting material and substrate may be electrostatically charged.

According to some embodiments of the present invention, a method of making a wipe includes stretching a layer of netting material via ring rolls or calendar rolls such that strands of the netting material break and extend outwardly to form teeth, and then bonding the layer of netting material to a substrate such that the strands extend outwardly from the substrate. The layer of netting material and substrate may be stretched in the MD and/or in a CD that is transverse to the MD. The netting material may be bonded to the substrate in any of various ways including, but not limited to, chemical bonding, thermal bonding, ultrasonic bonding, and/or physical bonding. Various articles including, but not limited to, mops, scrub brushes, cloths, may incorporate one or more wipes according to some embodiments of the present invention.

BRIEF DESCRIPTION OF THE DRAWINGS

The accompanying drawings, which form a part of the specification, illustrate key embodiments of the present invention. The drawings and description together serve to fully explain the invention.

FIG. 6 is an enlarged cross-sectional view of the teeth on the opposing rolls of the ring roll incremental stretching system of FIG. 5.

FIGS. 7A-7B illustrate an index pattern engraved on a ring roll according to embodiments of the present invention.

DETAILED DESCRIPTION OF THE INVENTION

Figure 1:
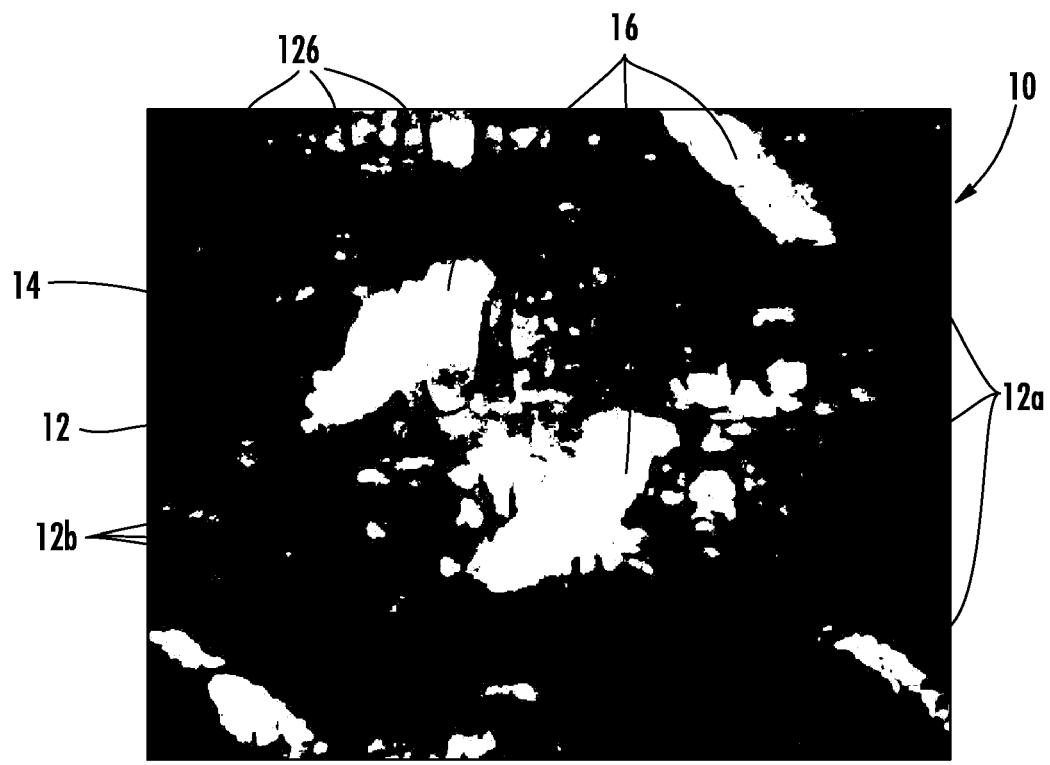
FIG. 1 is an enlarged portion of a wipe, according to some embodiments of the present invention.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of a wipe in use or operation in addition to the orientation depicted in the figures. For example, if the wipe in the figures is inverted, elements described as "under" or "beneath" other elements or features would then be oriented "over" the other elements or features. Thus, the exemplary term "under" can encompass both an orientation of "over" and "under". A wipe may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a "first" element, component, region, layer or section discussed below could also be termed a "second" element, component, region, layer or section without departing from the teachings of the present invention. The sequence of operations (or steps) is not limited to the order presented in the claims or figures unless specifically indicated otherwise.

According to embodiments of the present invention, a wipe with an abrasive surface is manufactured by bonding netting material to a substrate, such as a nonwoven structure, and then ring rolling the composite. Ring rolling breaks the netting material such that unbonded netting material pieces extend outwardly to form "teeth" that are abrasive to the touch. The surface is quite aggressive, and can scrub or abrade, or alternatively, can be made from softer polymer, and give a soft brush like surface that is very effective for cleaning and holding debris. It is important that the netting material break quickly and efficiently under the stretching stress load. Alternatively, the netting can be configured with an embossed or molded 'notch' to facilitate breaking.

Applications include floor wipes, pet wipes, wipes to be used in beautician shops, barber shops, etc. Moreover, the teeth may be oriented at an angle to enhance the ability to pick up hair and large particles.

According to embodiments of the present invention, netting material can be bonded to a substrate such that bond points substantially bond/trap machine direction (MD) netting material lines. Upon stressing in the cross direction (CD) via ring rolling, netting material lines in the CD direction break, and reorient to a more vertical or "Z" direction, thereby creating raised pieces/parts (i.e., forming teeth) that can abrade, catch hair, etc.

According to other embodiments of the present invention, net structures can be bonded to a substrate such that bond points substantially bond/trap CD direction net lines. Upon stressing in the MD direction via ring rolling, net lines in the MD break, thereby creating raised pieces/parts (i.e., forming teeth) that can abrade, catch hair, etc. According to other embodiments of the present invention, stressing in the MD and CD directions in combination can be performed to produce teeth.

According to some embodiments of the present invention, bonding a layer of netting material to a substrate may include embedding at least a portion of a layer of netting material within a substrate. According to some embodiments of the present invention, bonding a layer of netting material to a substrate may be performed by chemical bonding, thermal bonding, ultrasonic bonding, physical bonding, or some combination thereof. Adhesive bonding may include inserting an adhesive, an adhesive powder, an adhesive web, an adhesive net, or an adhesive film between a substrate and netting material.

Referring to FIG. 1, an enlarged portion of a wipe 10, according to some embodiments of the present invention, is illustrated. The illustrated wipe 10 includes a layer of netting material 12 bonded to a substrate 14.

Hatch marks 16 are bond points. The illustrated layer of netting material 12 includes a first set of strands 12a that extend along a first direction in spaced-apart, generally parallel relationship, and a second set of strands 12b that extend between and interconnect with the first set of strands in adjacent, spaced-apart relationship. The illustrated sets of strands 12a, 12b are substantially co-planar, but need not be. Netting material of various configurations many be utilized in accordance with embodiments of the present invention without limitation.

Figure 2:
FIG. 2 is a side section view of the wipe of FIG. 1 and illustrates broken strands in the netting material extending outwardly to form teeth.

FIG. 2 is a side section view of the wipe 10 of FIG. 1 and illustrates some of the strands in the netting material 12 being broken and extending outwardly to form "teeth" 18 after being ring rolled (described below). The teeth 18 may be broken strands from the first set 12a and/or broken strands from the second set 12b, depending on the direction in which stretching occurs via ring rolling (i.e., in the MD and/or in the CD).

Figure 3:
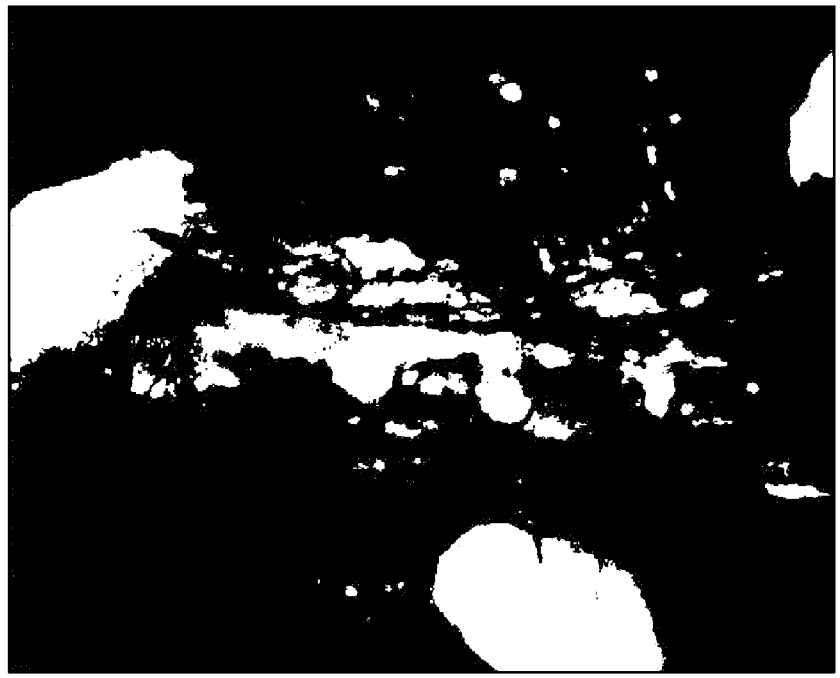
FIG. 3 is an enlarged plan view of a portion of the wipe of FIG. 2.

FIG. 3 is an enlarged plan view of a portion of the wipe 10 of FIG. 2 illustrating broken strands from the second set 12b.

Figure 4A:
FIGS. 4A, 4B, 4C, 4D are respective side views of a wipe, according to some embodiments of the present invention, that illustrate that the number of teeth formed via ring rolling increases with the depth of engagement of the ring rolls.
Figure 4B:
Figure 4C:
Figure 4D:

According to embodiments of the present invention, the formation of teeth 18 increases as the engagement of the ring rolls is increased. FIGS. 4A, 4B, 4C, 4D are respective side views that illustrate teeth formed via ring rolling. It is clear from FIGS. 4A-4D that the highest depth of engagement of the ring rolls produces the most teeth 18. In FIG. 4A, the depth of engagement of the ring rolls is 0.010 inch. In FIG. 4B, the depth of engagement of the ring rolls is 0.020 inch. In FIG. 4C, the depth of engagement of the ring rolls is 0.030 inch. In FIG. 4D, the depth of engagement of the ring rolls is 0.040 inch. As depth of engagement of the ring rolls increases, the number of teeth produced increases.

Netting material, according to embodiments of the present invention, can be made from many base raw materials including, but not limited to, thermosetting and thermoplastic materials including, but not limited to, polyolefins, nylons, polyesters, and ethylene vinyl acetate, and the like and blends thereof. The netting material basis weight can range from 15 to 200 gsm with a boss count ranging in MD and CD directions from 3 strands/inch to 100 strands/inch. (Boss count is the number of strands per inch in a net). A preferred netting material is the DELNET® brand net produced by Delstar Technologies Inc., Middletown, Del. However, other types of netting materials may be utilized, as well.

Netting materials can be attached to the surface of a substrate or can be embedded in the substrate. Netting materials can be bonded or stabilized in a variety of methods including chemically, thermally, ultrasonically and/or physically.

An alternative netting composite may be comprised of a ring rolled netting material, subsequently adhered to another substrate via adhesive lamination, thermal bonding, etc.

The netting material construction may have a soft side made of layers of nonwoven, woven, paper, film, foam or the like. The non-abrasive material may include an absorbent material such as rayon, pulp, super absorbent polymers, etc. to assist in wiping up spills and excess liquid. Alternately, a wipe may have an abrasive side on both surfaces of the wipe with a soft, spongy, or absorbent center material.

The soft side material, as well as the netting material, may be coated on one or both sides with a tackifying agent so as to enhance large particle/hair pick up capabilities of the wipe.

Additionally, according to some embodiments of the present invention, a wipe may be impregnated with cleaning solution, antiseptic, surfactant, antimicrobial, detergent, bleach, polish, facial cleanser, or any other active chemical ingredient.

According to some embodiments of the present invention, a wipe may be electrostatically charged to enhance dust and large particle pick-up capabilities. For example, either or both of the netting material and substrate may be electrostatically charged. An electrostatic charge may be applied to either or both of the netting material and substrate either before or after bonding the netting material to the substrate.

Substrate material to which netting material is bonded, according to embodiments of the present invention, may include, but is not limited to, woven material, knit material, netting material, nonwoven material, paper material, film material, sponge material and foam material. It is important that the material used as the support structure be stretchable, and have an 'elongation at break' that is higher than the netting.

An exemplary wipe construction is a 1.5 osy polypropylene net (style number RO412-10PR) made by Delnet with a boss count of 40 strands/in the MD and of 13 strands/in the CD direction that has been thermally bonded to 1 to 3 layers of 60 gsm 50% PP/50% Rayon spunlaced nonwoven fabric. The structure is then ring rolled at 0.030" depth of engagement. The net strand size in the MD direction is approximately 250 microns and the strand size in the CD direction is approximately 500 microns. Other possible constructions are listed in Table 1 below and can be combined with a or without tack finish, soap, detergent, cleaning solution, antiseptic, surfactant, antimicrobial, detergent, bleach, polish, facial cleanser. Structures can also be electrostatically charged to enhance hair pick up.

TABLE I

| Top Layer | Mid layers | | Bottom Layers |
|---|---|---|---|
| net | Nonwoven | | |
| net | Film | Nonwoven | |
| net | nonwoven/flim | airlaid | nonwoven/flim |
| net | nonwoven/film | paper | nonwoven/flim |
| net | nonwoven/flim | foam | nonwoven/film |
| net | Foam | | |
| net | Paper | nonwoven/film | |
| net | Airlaid | nonwoven/flim | |
| net | woven fabric | | |
| net | Sponge | | |
| net | Nonwoven | Net | |
| net | woven fabric | Net | |

According to other embodiments of the present invention, the abrasiveness of spunbond netting material can be enhanced by stressing the fibers to break and cause them to stand up. This may occur with or without thermal bonding the spunbond netting material to another layer.

According to embodiments of the present invention, one method for forming breaks in netting material is to pass the netting material through the nip formed by an incremental stretching system or ring rolls employing opposed pressure applicators and having 3-dimensional surfaces which, at least to a degree, are complementary to one another. Stretching of the netting material may be accomplished by other methods known in the art including, but not limited to, tentering, bow rolls, or even by hand. However, to achieve even strain levels across structures, an incremental stretching system, such as disclosed herein, is preferred.

Figure 5:
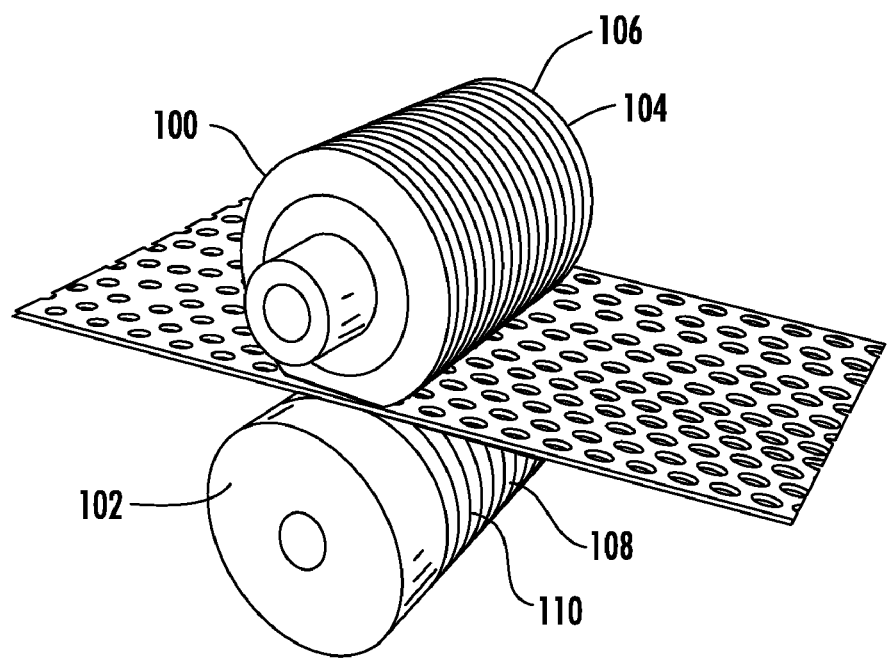
FIG. 5 is a perspective view of a ring roll incremental stretching system that can be utilized in accordance with some embodiments of the present invention.

An exemplary ring roll incremental stretching system is illustrated in FIG. 5 and includes incremental stretching rollers 100, 102. The incremental stretching roller 100 includes a plurality of teeth 104 and corresponding grooves 106 which extend about the entire circumference of roller 100. Incremental stretching roller 102 includes a plurality of teeth 108 and a plurality of corresponding grooves 110. The teeth 104 on roller 100 intermesh with or engage the grooves 110 on roller 102, while the teeth 108 on roller 102 intermesh with or engage the grooves 106 on roller 100.

Referring to FIG. 6, the degree to which the teeth 104, 108 on the opposing rolls 100, 102 intermesh is referred to herein as the "depth of engagement" or "DOE". The teeth in one roll can be offset by one-half pitch from the teeth in the other roll, such that the teeth of one roll mesh in the valley between the teeth in the mating roll. The offset permits intermeshing of the two rollers when the rollers are in operative position relative to one another. According to some embodiments, the teeth of the respective rollers are only partially intermeshing.

In the illustrated embodiment, the teeth 104, 108 on each roller 100, 102 are generally triangular-shaped, but may have various configurations. According to embodiments of the present invention, the apex of the teeth 104, 108 may be slightly rounded, if desired for certain effects in the finished web. The "pitch" refers to the difference between the apexes of the teeth 104, 108. The pitch may be between 0.02 to about 0.40 inches, and is preferably between about 0.05 and 0.20 inches. The height or depth of the teeth 104, 108 is measured from the base of each tooth to the apex of each tooth, and is preferably equal for all teeth. The height of the teeth 104, 108 may be between about 0.10 to 1.50 inch, and is preferably about 0.25 inches and 0.50 inches.

Ring rolling can be performed with MD ring rolls, CD ring rolls, alternating sections of ring rolls and no ring rolls, and alternating sections of MD and CD ring rolling. Interdigitating rolls are described in U.S. Pat. No. 4,368,565, which is incorporated herein by reference in its entirety. The incremental stretching of nonwoven to film laminates is described in U.S. Pat. No. 4,285,100 to Schwarz, which is incorporated herein by reference in its entirety.

Applications for embodiments of the present invention include multipurpose wipes (car wipes for paint preparation, kitchen and bathroom wipe, shop wipe, floor wipe, laundry wipe, grooved surface wiper, etc.); cosmetic wipes (wipes for exfoliation, a pumice stone alternative, alternative back scratcher, etc.); hooks (general hygiene area, floor wipe attachment, 'felt friend' attachment, rug on rug skid prevention, disposable to semi-durable car mat, etc.). Embodiments of the present invention can be applied in garden and landscape areas as a tree wrap to deter deer/animals, as a garden vegetable wrap to deter bugs from climbing up stalks, as a landscape fabric in which the teeth would aid in holding mulch and prevent wood chips from moving away from a designated area. In pet areas, embodiments of the present invention can be used as a disposable scratching post as well as a cat mat in which to remove extraneous kitty litter off of cat paws and to retain litter near a litter box.

Other applications for embodiments of the present invention include non-skid rug pads for kitchen and hardwood floors, non-slip surfaces for chair pads and other upholstery items.

EXAMPLE 1

One layer of DELNET® brand polypropylene netting material was thermally bonded to 2 layers of 60 gsm 50% polypropylene/50% Rayon spunlace. The structure was made using a thermal calendar containing one smooth roll and one roll engraved with an index pattern as illustrated in FIGS. 7A-7B. A sample was made at 410 psi, 100 ft/min, an engraved roll temperature of 270° F. and a smooth roll temperature of 340° F. The net was oriented toward the engraved roll where as the spunlace faced the smooth roll.

In an effort to decrease stiffness of the structure and enhance abrasiveness, the sample was run between a set of ring rolls. Structure abrasion was enhanced by netting strands in the CD direction that broke and stood on end to create a more abrasive surface.

The netting material was bonded to a PP spunbond/airlaid structure, to a bicomponent airlaid and to a PP spunbond-meltblown-spunbond (SMS) construction. This composite was ring rolled at 0.050" depth of engagement and 0.060" pitch to create the enhanced abrasion.

Base net structure was ring rolled at various depths of engagement from 0.010" to 0.070". Throughout this application such samples will be described as CTx-033104c9 to indicate ring rolling to x/100" and base sample. For example, CT1-033104c9 is sample 033104c9 ring rolled 0.010".

Net structures were also made using a diamond thermal bonding pattern. Breaking and raising of the teeth after ring rolling was also observed.

EXAMPLE 2

Abrasive net structures, according to embodiments of the present invention, were observed to have excellent large particle/hair pick-up capabilities, as compared with conventional wipes before the addition of an electrostatic charge.

A test method was developed to quantify the hair pickup characteristics of a ring-rolled net composite according to embodiments of the present invention. The composite was comprised of a 1.5 osy PP DELNET® brand net, R0412-10PR, thermally bonded to two layers of 60 gsm PP/rayon [50/50] spunlace, using the index pattern. The composite was ring-rolled using laboratory equipment, using various depths of engagement (DOE). The DOEs included 0.010", 0.020", 0.030", and 0.04". The ring-rolled composites were cut to a sample size of 4⅛"×5 3/16". The following hair was used: New York Queen Collection, 100% human hair, top grade, supreme yaki, fine, straight hair.

Thirteen inch (13") full length hair was separated and laid onto a metal lab bench. More hair was laid down than any of the test samples could pick up. Ring-rolled and non-ring-rolled samples were rubbed over the hair to determine how much each sample would hold. The hair-containing sample was lifted off the lab bench for ten seconds to let any loose hair fall back to the bench top. The hair that remained attached to the sample was pulled off and weighed. The test was repeated with different lengths of hair. The test was also performed using a full size Swiffer® Wet Jet pad that was dry. The following results set forth in Table 2 were generated:

TABLE 2

| Hair Length [in] | Swiffer Wet Jet Pad [grams] | 033104c9 DOE = 0" [grams] | CT1-033104c9 DOE = 0.010" [grams] | CT2-033104c9 DOE = 0.020" [grams] | CT3-033104c9 DOE = 0.030" [grams] | CT4-033104c9 DOE = 0.040" [grams] |
|---|---|---|---|---|---|---|
| 0.25 | 0.06 | 0 | 0.6 | 0.6 | 1.3 | 1.8 |
| 1 | 0.23 | 0 | 0.6 | 0.4 | 0.9 | 1 |
| 3 | 0.04 | 0 | 0.2 | 0.4 | 0.8 | 1.2 |
| 6 | 0.02 | 0 | 0.6 | 0.5 | 1 | 1.1 |
| 13 | 0.02 | 0 | 0.3 | 0.3 | 0.3 | 0.5 |
| Pad Size | 11.5" × 5.5" | | | 4⅛" × 5³⁄₁₆" | | |
| Area (in2) | 63.25 | | | 21.4 | | |

Figure 8:
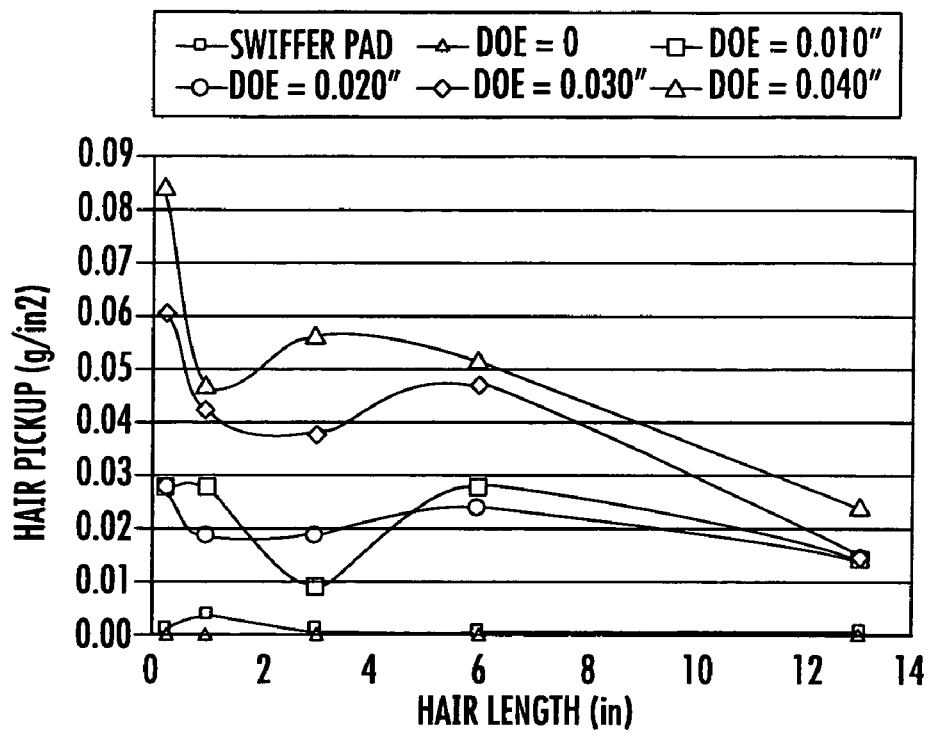
FIG. 8 is a graph that illustrates hair pick-up capability of several wipes, according to embodiments of the present invention.

The non-ring-rolled net did not pick up any amount of any length of hair. In general, as the ring-roll DOE increased, the amount of hair picked up increased due to the formation of teeth. As compared to the net composites in FIG. 8, the current floor wipe pad performed poorly in terms of hair pick-up.

EXAMPLE 3

Net structures, according to embodiments of the present invention, were found to have excellent abrasion without damaging Teflon, paint and metal surfaces.

A test method was developed to quantify the level of abrasiveness that ring-rolling of the net composite created. A 6 station Nu Martindale Abrasion and Pilling Tester was used in the test. The non-ring-rolled composite, along with the ring-rolled composites (0.010, 0.020, 0.030, and 0.040" DOEs) were set up to abrade a 100% PP nonwoven, using 160 cycles and 9 kPa.

When the abrading was completed, it was observed that the PP nonwoven abraded with the non-ring-rolled composite had very few raised fibers. The nonwoven abraded with the 0.010" DOE ring-rolled composite had a small amount of raised fibers. The remaining samples had a significant amount of raised fibers, by visual inspection.

Table 3 illustrates the abrasion of the PP nonwoven by the abrasive samples, as measured by PP nonwoven weight loss after abrading.

TABLE 3

| Ring-roll DOE [in] | Abraded material [mg] |
|---|---|
| 0 | 0 |
| 0.01 | 5.9 |
| 0.02 | 27.4 |
| 0.03 | 62.8 |
| 0.04 | 40.5 |

Figure 9:
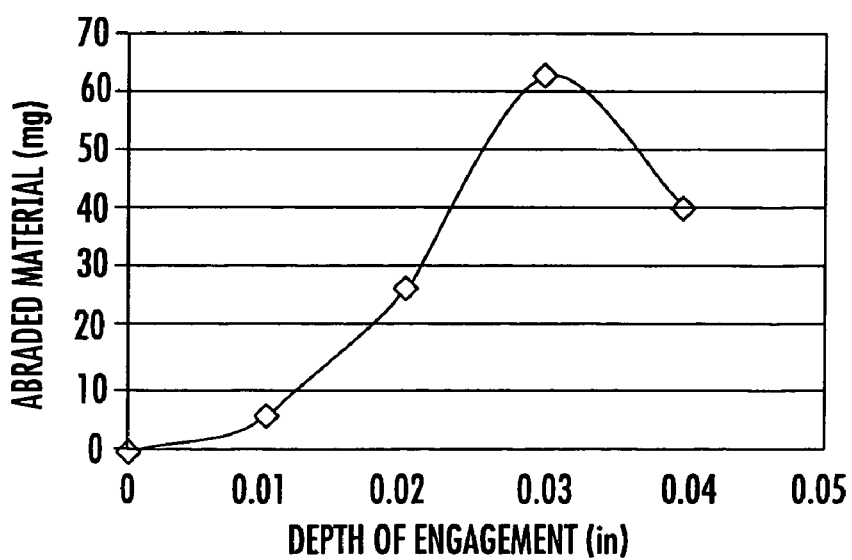
FIG. 9 is a graph that illustrates the correlation between abrasiveness of a wipe and depth of engagement of ring rolls used in stretching the wipe, according to some embodiments of the present invention.

Abrasiveness versus ring roll DOE is illustrated in FIG. 9. The PP nonwoven abraded with the non-ring-rolled sample did not lose any weight after abrading. The nonwoven abraded with ring-rolled samples had much more abrasion, shown by more weight loss. To the touch, the net composite ring-rolled at 0.040" DOE felt significantly more abrasive than the material ring-rolled at 0.030" DOE. At 0.040" DOE, the bond points in the example net construction began to weaken, causing the net to separate from the nonwoven. The weakening bond would lessen its effectiveness when abrading surfaces. With the improvement of bonding, the nonwoven exposed to the 0.040" DOE ring-rolled composite could have a higher value than the nonwoven exposed to the 0.030" DOE sample.

EXAMPLE 4

A ring-rolled net composite was tested for abrasive resiliency after weight exposure. A 4⅛" by 5³⁄₁₆" sample was placed on a lab bench under a 15 lbs weight for approximately 24 hours (0.7 psi). The sample felt just as abrasive after the weight was removed as it did before the weight was applied. This would be a good simulation to the force used to wipe floors, appliances, kitchenware and counters.

EXAMPLE 5

Along with abrasiveness and large particle pick up, drapability also improved with ring rolling. A 4" by 7" sample was cut in MD and CD and a Thwing Albert handleometer was used to test stiffness/drapability. As shown in the Table 4 below, stiffness decreased by 30% in the MD and 900% in the CD as ring rolling was increased to 0.040".

TABLE 4

| Ring-roll DOE [in] | Handleometer measurements | |
|---|---|---|
| | MD [g] | CD [g] |
| 0 | 151.4 | 82.1 |
| 0.01 | 151.5 | 50.9 |
| 0.02 | 151.5 | 41.7 |
| 0.03 | 141.4 | 38.5 |
| 0.04 | 116.9 | 9.2 |

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to is be included therein.

That which is claimed is:

1. A wipe comprising:
a substrate; and
a layer of netting material bonded to the substrate, wherein the netting material comprises at least two sets of strands, wherein each set of strands crosses and interconnects another set of strands at a substantially fixed angle, wherein strands in each set extend along a respective direction and are in substantially co-planar, spaced-apart relationship, and wherein the netting material has been stretched such that some of the strands in the at least two sets of strands are broken and the portions of said strands that are broken comprise raised pieces/parts that extend outwardly from the substrate.

2. The wipe of claim 1, wherein the broken strands extending outwardly from the substrate form an abrasive surface.

3. The wipe of claim 1, wherein the broken strands extending outwardly from the substrate form a surface configured to collect and hold loose hair.

4. The wipe of claim 1, wherein the broken strands extending outwardly from the substrate form a surface configured to collect large particles of dirt.

5. The wipe of claim 1, wherein the substrate comprises material selected from the group consisting of: woven material, knit material, netting material, nonwoven material, paper material, film material, sponge material and foam material.

6. The wipe of claim 1, wherein the netting material comprises material selected from the group consisting of: thermosetting materials, thermoplastic materials, and blends thereof.

7. The wipe of claim 1, wherein the substrate has an elongation at break that is higher than that of the layer of netting material.

8. The wipe of claim 1, wherein at least a portion of the layer of netting material is embedded within the substrate.

9. The wipe of claim 1, wherein the netting material and/or substrate is coated with a tackifying agent.

10. The wipe of claim 1, wherein the netting material and/or substrate is impregnated with one or more chemical ingredients selected from the group consisting of: cleaning solutions, soaps, antiseptics, surfactants, antimicrobial agents, tackifying agents, detergents, bleaches, polishes, and facial cleansers.

11. The wipe of claim 1, wherein the netting material and/or substrate is electrostatically charged.

12. A mop comprising:
an elongate handle; and
a mop head attached to the handle that includes a pad, wherein the pad comprises:
a substrate; and
a layer of netting material bonded to the substrate, wherein the netting material comprises at least two sets of strands, wherein each set of strands crosses and interconnects another set of strands at a substantially fixed angle, wherein strands in each set extend along a respective direction and are in substantially co-planar, spaced-apart relationship, and wherein the netting material has been stretched such that some of the strands in the at least two sets of strands are broken and the portions of said strands that are broken comprise raised pieces/parts that extend outwardly from the substrate.

13. A cloth comprising:
a panel comprising a surface;
a substrate attached to the panel surface; and
a layer of netting material bonded to the substrate, wherein the netting material comprises at least two sets of strands, wherein each set of strands crosses and interconnects another set of strands at a substantially fixed angle, wherein strands in each set extend along a respective direction and are in substantially co-planar, spaced-apart relationship, and wherein the netting material has been stretched such that some of the strands in the at least two sets of strands are broken and the portions of said strands that are broken comprise raised pieces/parts that extend outwardly from the substrate.

14. A scrub brush comprising:
a body comprising a surface;
a substrate attached to the body surface; and
a layer of netting material bonded to the substrate, wherein the netting material comprises at least two sets of strands, wherein each set of strands crosses and interconnects another set of strands at a substantially fixed angle, wherein strands in each set extend along a respective direction and are in substantially co-planar, spaced-apart relationship, and wherein the netting material has been stretched such that some of the strands in the at least two sets of strands are broken and the portions of said strands that are broken comprise raised pieces/parts that extend outwardly from the substrate.

* * * * *

UNITED STATES PATENT AND TRADEMARK OFFICE
CERTIFICATE OF CORRECTION

PATENT NO.        : 7,917,985 B2                                      Page 1 of 1
APPLICATION NO.   : 11/416575
DATED             : April 5, 2011
INVENTOR(S)       : Kyra Dorsey et al.

It is certified that error appears in the above-identified patent and that said Letters Patent is hereby corrected as shown below:

<u>Column 6</u>

Line 3 of Table I, delete the words "flim" and insert --film--.

Line 5 of Table I, delete "flim" and insert --film--.

Line 8 of Table I, delete "flim" and insert --film--.

<u>Column 10</u>

Line 66, delete "is".

Signed and Sealed this
Twenty-eighth Day of February, 2012

David J. Kappos
*Director of the United States Patent and Trademark Office*